US012374266B2

(12) United States Patent
Han et al.

(10) Patent No.: US 12,374,266 B2
(45) Date of Patent: Jul. 29, 2025

(54) LEVEL SHIFTER AND DISPLAY DEVICE INCLUDING THE SAME

(71) Applicant: LG Display Co., Ltd., Seoul (KR)

(72) Inventors: Jae Won Han, Paju-si (KR); Soon Dong Cho, Paju-si (KR); Min Gyu Park, Paju-si (KR); Sun Young Kim, Paju-si (KR); Se Dong Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 71 days.

(21) Appl. No.: 18/528,481

(22) Filed: Dec. 4, 2023

(65) Prior Publication Data

US 2024/0221600 A1 Jul. 4, 2024

(30) Foreign Application Priority Data

Dec. 28, 2022 (KR) ........................ 10-2022-0187229

(51) Int. Cl.

| | |
|---|---|
| ***G09G 3/20*** | (2006.01) |
| ***G09G 3/3233*** | (2016.01) |
| ***G09G 3/36*** | (2006.01) |

(52) U.S. Cl.

CPC ......... *G09G 3/2096* (2013.01); *G09G 3/3233* (2013.01); *G09G 3/3648* (2013.01); *G09G 2300/0842* (2013.01); *G09G 2310/0289* (2013.01); *G09G 2310/0291* (2013.01); *G09G 2310/08* (2013.01)

(58) Field of Classification Search

None

See application file for complete search history.

(56) References Cited

U.S. PATENT DOCUMENTS

| | | | | |
|---|---|---|---|---|
| 10,810,946 | B2 | 10/2020 | Han et al. | |
| 2020/0020280 | A1 | 1/2020 | Han et al. | |
| 2022/0208058 | A1 * | 6/2022 | Hwang | G09G 3/3266 |

FOREIGN PATENT DOCUMENTS

| | | | |
|---|---|---|---|
| KR | 10-2020-0007317 | A | 1/2020 |
| KR | 10-2021-0079617 | A | 6/2021 |

* cited by examiner

*Primary Examiner* — Christopher J Kohlman

(74) *Attorney, Agent, or Firm* — Fenwick & West LLP

(57) ABSTRACT

Embodiments disclose a level shifter including a logic unit configured to receive timing data and channel data and output an edge signal and a channel signal at a time point defined in the timing data, and a channel selection unit configured to select at least one channel from among a plurality of connected channels according to the channel signal and transmit the edge signal, and a display device including the same.

20 Claims, 14 Drawing Sheets

| | Q | Qd | X_1 | X_2 | X_3 |
|---|---|---|---|---|---|
| T1 | 1 | 0 | 1 | 0 | 0 |
| T2 | 1 | 1 | 0 | 1 | 0 |
| T3 | 0 | 1 | 1 | 0 | 0 |
| T4 | 0 | 0 | 0 | 0 | 1 |

LEVEL SHIFTER AND DISPLAY DEVICE INCLUDING THE SAME

CROSS-REFERENCE TO RELATED APPLICATION

This application claims priority to and the benefit of Republic of Korea Patent Application No. 10-2022-0187229, filed on Dec. 28, 2022, which is hereby incorporated by reference in its entirety.

BACKGROUND

1. Field of the Invention

Embodiments relate to a level shifter and a display device including the same.

2. Discussion of Related Art

A driving circuit of a flat panel display (FPD) device writes pixel data of an input image to pixels of a display panel so that the input image is reproduced on a pixel array. A driving circuit of the display device includes a data driving circuit configured to supply a data signal to data lines, a gate driving circuit configured to supply a gate pulse to gate lines, a timing controller configured to control operation timings of the data driving circuit and the gate driving circuit, and the like.

The display device may include a level shifter for generating a clock that is input to a driving circuit of the display panel. However, most of the level shifters have a problem in that a memory and an output buffer are disposed for each channel, which increases the cost and size.

SUMMARY

Embodiments provide a level shifter allowing the number of memories and output buffers to be reduced.

It should be noted that the object of the present disclosure is not limited to the above-described object, and other objects of the present disclosure will be apparent to those skilled in the art from the following descriptions.

In one embodiment, a level shifter comprises: at least one input terminal; a plurality of output terminals; a logic circuit configured to receive timing data defining a time point and channel data via the at least one input terminal, and output an edge signal at the time point defined in the timing data and a channel signal based on the channel data; and a channel selection circuit connected to the logic circuit and including a plurality of channels that each correspond to one of the plurality of output terminals, the channel selection circuit configured to receive the edge signal and the channel signal, select a channel from the plurality of channels according to the channel signal, and output the edge signal to the selected channel, wherein a gate control signal that is based on the edge signal is output by the level shifter to a gate driving circuit that is connected to the level shifter via an output terminal from the plurality of output terminals that corresponds to the selected channel.

In one embodiment, a level shifter comprises: at least one input terminal; a plurality of output terminals including a first output terminal and a second output terminal that is arranged after the first output terminal; a logic circuit configured to receive first timing data defining a first time point and first channel data via the at least one input terminal, and output a first edge signal at the first time point defined in the first timing data and a first channel signal based on the first channel data; and a channel selection circuit connected to the logic circuit and including a plurality of channels that are sequentially arranged and each channel corresponding to one of the plurality of output terminals, the plurality of channels includes a first channel corresponding to the first output terminal and a second channel that is arranged after the first channel and corresponding to the second output terminal, wherein the channel selection circuit is configured to receive the first edge signal and the first channel signal, select the second channel from the plurality of channels based on the first channel signal, and output the first edge signal to the second channel, wherein the level shifter is configured to output a first gate control signal that is based on the first edge signal to a gate driving circuit via the second output terminal prior to a second gate control signal being output to the gate driving circuit via the first output terminal.

In one embodiment, a level shifter comprises: at least one input terminal; a plurality of output terminals including a first output terminal and a second output terminal that is arranged after the first output terminal; a logic circuit configured to receive timing data defining different time points and channel data via the at least one input terminal, and output edge signals at the different time points defined in the timing data and channel signals based on the channel data; and a channel selection circuit connected to the logic circuit and including a plurality of channels that are sequentially arranged and each channel corresponding to one of the plurality of output terminals, the plurality of channels includes a first channel corresponding to the first output terminal and a second channel that is arranged after the first channel and corresponding to the second output terminal, wherein the channel selection circuit is configured to receive the edge signals and the channel signals, select for each of the edge signals a channel from the plurality of channels based on a channel signal from the channel signals that corresponds to the edge signal, and output each edge signal to the selected channel, wherein the level shifter is configured to output a first gate control signal that is based on a first edge signal to a gate driving circuit via the first output terminal while the first channel is selected by the channel selection circuit, and a voltage level of the first gate control signal is maintained for a predetermined period of time while the first channel is no longer selected and while a second gate control signal is output via the second output terminal that corresponds to the second channel that is selected by the channel selection circuit.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION

Figure 1:
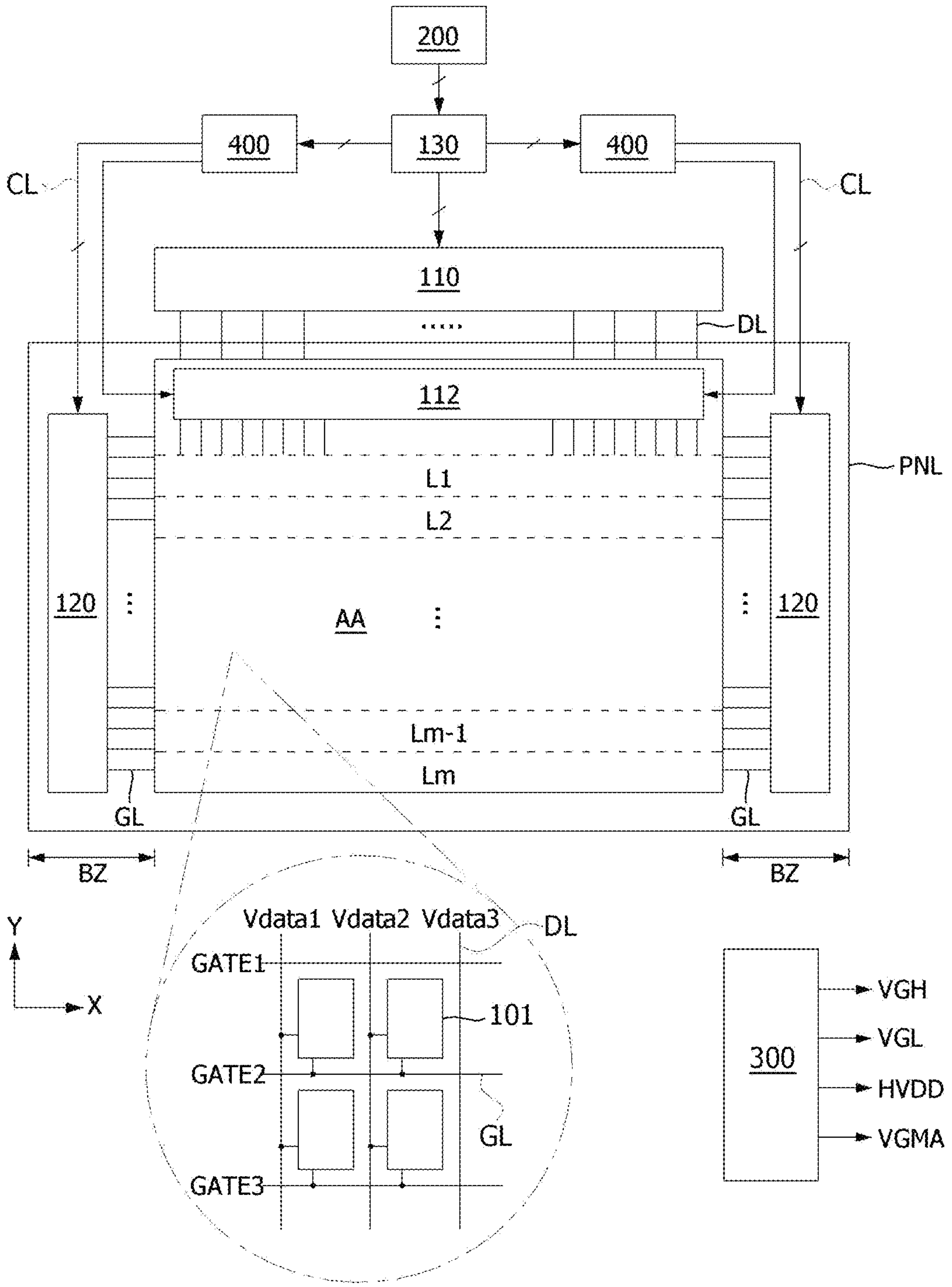
FIGS. 1 and 2 are diagrams illustrating a display device according to an embodiment of the present disclosure.

Advantages and features of the present disclosure and implementation methods thereof will be clarified through the following embodiments described with reference to the accompanying drawings. However, the present disclosure is not limited to the embodiments described below and may be embodied with a variety of different modifications. The embodiments are merely provided to allow those skilled in the art to completely understand the scope of the present disclosure, and the present disclosure is defined only by the scope of the claims.

The figures, dimensions, ratios, angles, numbers, and the like disclosed in the drawings for describing the embodiments of the present disclosure are merely illustrative and thus the present disclosure is not limited to matters illustrated in the drawings. Throughout the specification, like reference numerals refer to substantially like components. Further, in describing the present disclosure, detailed descriptions of well-known technologies will be omitted when it is determined that they may unnecessarily obscure the gist of the present disclosure.

Terms such as "including," "having," and "composed of" used herein are intended to allow other elements to be added unless the terms are used with the term "only." Any references to the singular may include the plural unless expressly stated otherwise.

Components are interpreted as including an ordinary error range even if not expressly stated.

For description of a positional relationship, for example, when the positional relationship between two parts is described as "on," "above," "below," "over," "under," and "next to," and the like, one or more parts may be interposed therebetween unless the term "immediately" or "directly" is used in the expression.

Although the terms first, second, and the like are used to distinguish the components, the functions or structures of these components are not limited by the ordinal number before the component or the name of the component. Since the claims are described with respect to the essential components, the ordinal numbers applied before the component names of the claims and the ordinal numbers applied before the component names of the embodiments may not be matched.

The following embodiments may be partially or entirely bonded to or combined with each other and may be inter-operated and performed in technically various ways. Each of the embodiments may be independently operable with respect to each other and may be implemented together in related relationships.

In a display device of the present disclosure, a display panel driving circuit, a pixel array, a level shifter, and the like may each include transistors. The transistors may be implemented as oxide thin-film transistors (TFTs) including an oxide semiconductor, low-temperature polysilicon (LTPS) TFTs including LTPS, and the like.

A transistor is a three-electrode element including a gate, a source, and a drain. The source is an electrode that provides carriers to the transistor. The carriers in the transistor start to flow from the source. The drain is an electrode through which the carriers are discharged from the transistor to the outside. In the transistor, carriers flow from the source to the drain. In the case of an n-channel transistor, carriers are electrons, and thus a source voltage is lower than a drain voltage so that the electrons flow from the source to the drain. In the n-channel transistor, current flows from the drain to the source. In the case of a p-channel transistor, carriers are holes, and thus a source voltage is higher than a drain voltage so that the holes flow from the source to the drain. In the p-channel transistor, since the holes flow from the source to the drain, current flows from the source to the drain. It should be noted that the source and the drain of the transistor are not fixed in position. For example, the source and the drain are interchangeable depending on the applied voltage. Accordingly, the present disclosure is not limited by the source and the drain of the transistor. In the following description, the source and the drain of the transistor will be referred to as a first electrode and a second electrode, respectively.

A gate pulse swings between a gate-on voltage and a gate-off voltage. The gate-off voltage may be interpreted as a first voltage, and the gate-on voltage may be interpreted as a second voltage. The transistor is turned on in response to the gate-on voltage while being turned off in response to the gate-off voltage. In the case of an n-channel transistor, the gate-on voltage may be a gate-high voltage VGH, and the gate-off voltage may be a gate-low voltage VGL. In the case of a p-channel transistor, the gate-on voltage may be agate-low voltage VGL, and the gate-off voltage may be a gate-high voltage VGH.

The present disclosure is applicable to any display device requiring a level shifter such as a liquid crystal display (LCD), an organic light-emitting diode (OLED) display, and the like.

Hereinafter, various embodiments of the present disclosure will be described in detail with reference to the accompanying drawings.

Figure 2:
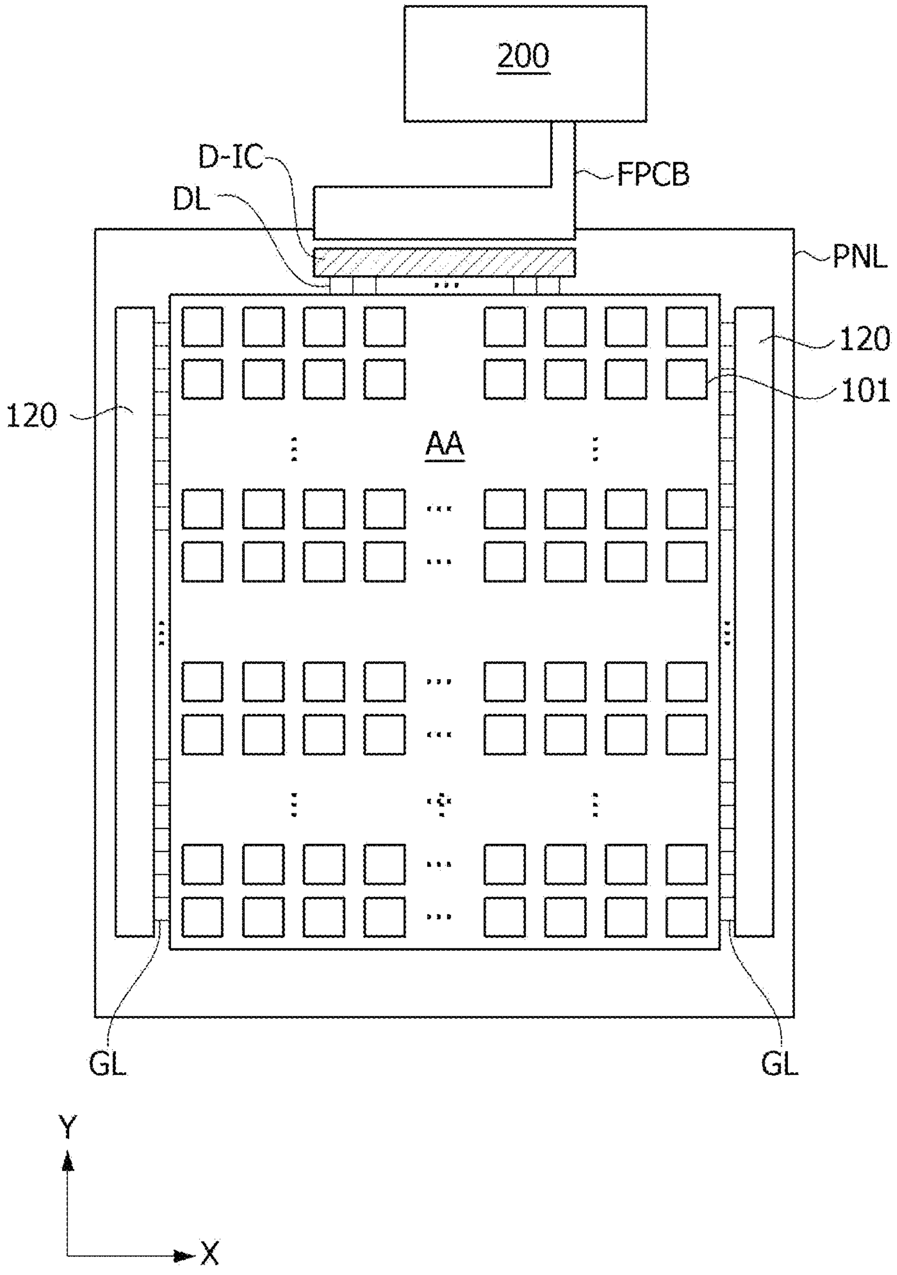

Referring to FIGS. 1 and 2, a display device according to an embodiment of the present disclosure includes a display panel PNL and a display panel driving circuit.

A display area of the display panel PNL includes a pixel array AA for displaying pixel data of an input image. The pixel data of the input image is displayed on pixels of the pixel array AA. The pixel array AA includes a plurality of data lines DL, a plurality of gate lines GL intersecting the data lines DL, and the pixels disposed in a matrix form. In addition to the matrix form, the pixels may be disposed in various forms, such as a form in which pixels emitting the same color are shared, a stripe form, a diamond form, and the like.

When the pixel array AA has a resolution of m×n, the pixel array AA includes n pixel columns and m pixel rows L1 to Lm that intersect the pixel columns. The pixel row includes pixels disposed in a first direction X. The pixel column includes pixels disposed in a second direction Y vertical to the first direction. One horizontal period 1H is a time obtained by dividing one frame period by the number of m pixel rows L1 to Lm. Pixel data is written to pixels of one pixel row in one horizontal period 1H.

Each of the pixels includes two or more sub-pixels 101 for color implementation. For example, each of the pixels may be divided into a red sub-pixel, a green sub-pixel, and a blue sub-pixel. Each of the pixels may further include a white sub-pixel. Each of the sub-pixels 101 includes a pixel circuit. The pixel circuit includes a pixel electrode, one or more thin-film transistors (TFTs), and a capacitor. The pixel circuit is connected to the data line DL and the gate line GL.

Touch sensors may be disposed on the display panel PNL to implement a touch screen. A touch input may be sensed using separate touch sensors or through the pixels. The touch sensors may be implemented as on-cell type or add-on type touch sensors, which are arranged on the screen of the display panel, or may be implemented as in-cell type touch sensors, which are embedded in the pixel array.

The display panel driving circuit writes data of an input image to pixels of a display panel 100 under the control of a timing controller 130. The display panel driving circuit includes a data driving unit 110, a gate driving unit 120, a timing controller 130 for controlling operation timings of the driving units 110 and 120, a level shifter 400 connected between the timing controller 130 and the gate driving unit 120, and a power supply unit 300.

The data driving unit 110 (e.g., a data driving circuit) converts pixel data of an input image received as a digital signal from the timing controller 130 into an analog gamma compensation voltage for each frame to output data signals Vdata1 to Vdata3. The data signals Vdata1 to Vdata3 output from the data driving unit 110 are supplied to the data lines DL. The data driving unit 110 may output the data signals Vdata1 to Vdata3 using a digital-to-analog converter (hereinafter referred to as a "DAC") that converts a digital signal into an analog gamma compensation voltage. The data driving unit 110 may be integrated into a source driver integrated circuit (IC) 110*a* illustrated in FIGS. 5A to 5C. The source driver IC 110*a* may be mounted on a chip-on-film (COF) 110*b* and connected between source printed circuit boards (PCBs) 152 and 153 and the display panel 100. A touch sensor driving unit for driving the touch sensors may be embedded in each source driver IC 110*a*.

The display panel driving circuit may further include a demultiplexer array 112 disposed between the data driving unit 110 and the data lines DL.

The demultiplexer array 112 may time-divide a data signal output from one channel of the data driving unit 110 and distribute the time-divided data signal to the data lines DL by sequentially connecting the one channel of the data driving unit 110 to the plurality of data lines DL, thereby reducing the number of channels of the data driving unit 110.

The gate driving unit 120 (e.g., a gate driving circuit) may be formed in a bezel area BZ in which an image is not displayed on the display panel 100, or at least a part of the gate driving unit 120 may be arranged in the pixel array AA. The gate driving unit 120 receives a clock received from the level shifter 400 and outputs gate pulses GATE. The gate pulses GATE are supplied to the gate lines GL.

Gate pulses GATE1 to GATE3 applied to the gate lines GL turn on switch elements of the sub-pixels 101 to select pixels to which voltages of the data signals Vdata1 to Vdata3 are charged. The switch elements of the sub-pixels 101 are turned on in response to the gate-on voltages VGH of the gate pulses GATE1 to GATE3, and are turned off according to the gate-off voltages VGL. The gate pulse GATE swings between the gate-on voltage VGH and the gate-off voltage VGL. The gate driving unit 120 shifts the gate pulse using shift registers.

The timing controller 130 may multiply an input frame frequency by i and control the operation timing of the driving units 110 and 120 in the display panel with the frame frequency of the input frame frequency×i Hz (here "i" is a positive integer greater than 0). The frame frequency is 60 Hz in the National Television Standards Committee (NTSC) scheme and 50 Hz in the Phase-Alternating Line (PAL) scheme.

The timing controller 130 receives pixel data of an input image and timing signals synchronized with the pixel data from a host system 200. The pixel data of the input image received by the timing controller 130 is a digital signal. The timing controller 130 transmits the pixel data to the data driving unit 110. The timing signals include a vertical synchronization signal Vsync, a horizontal synchronization signal Hsync, a clock signal DCLK, a data enable signal DE, and the like. The vertical synchronization signal Vsync and the horizontal synchronization signal Hsync may be omitted since a vertical period and a horizontal period may be obtained by a method of counting the data enable signal DE. The data enable signal DE has a period of one horizontal period 1H.

The timing controller 130 may generate a data timing control signal for controlling the data driving unit 110, a gate timing control signal for controlling the gate driving unit 120, a control signal for controlling switch elements of the demultiplexer array 112, and the like based on the timing signals received from the host system 200. The gate timing control signal may be generated as a clock of a digital signal voltage level.

The host system 200 may be one among a television (TV), a set-top box, a navigation system, a personal computer (PC), a home theater device, a mobile system, and a wearable system. In the mobile system and the wearable system, the data driving unit 110, the timing controller 130, and a level shifter 400, 400*a*, or 400*b* (shown in FIGS. 5A to 5C) may be integrated into a single driver IC D-IC as shown in FIG. 2. In the mobile system, the host system 200 may be implemented as an application processor (AP). The host system 200 may transmit the pixel data of the input image to the driver IC D-IC through a mobile industry processor interface (MIPI). The host system 200 may be connected to the driver IC D-IC via a flexible printed circuit, for example, a flexible printed circuit board (FPCB).

The clock output from the level shifter 400 swings between the gate-on voltage VGH and the gate-off voltage VGL and is supplied to the gate driving unit 120 via clock lines CL. The clock output from the level shifter 400, 400*a*, or 400*b* may be applied to at least one of the demultiplexer array 112, the gate driving unit 120, and the touch sensor driving unit.

The power supply unit 300 (e.g., a power supply circuit) generates voltages required for driving the pixel array and the display panel driving circuit of the display panel 100 by using a DC-DC converter. The DC-DC converter may include a charge pump, a regulator, a buck converter, a boost converter, a buck-boost converter, and the like.

The power supply unit 300 may adjust a DC input voltage output from the host system 200 to generate DC voltages such as a gamma reference voltage VGMA, the gate-on voltage VGH, the gate-off voltage VGL, a half VDD HVDD, common voltages of the pixels, and the like. The voltage of the half VDD may be about half the voltage of VDD and may be used as a driving voltage of an output buffer of the source driver IC. The gamma reference voltage VGMA is supplied to the data driving unit 110. The gamma reference voltage VGMA is divided according to a gray scale using a voltage dividing circuit of the data driving unit 110 and supplied to the DAC of the data driving unit 110. The power supply unit 300 may generate constant voltages commonly applied to the pixels, for example, a common voltage Vcom, a pixel driving voltage EVDD, and a pixel base voltage EVSS.

Figure 3:
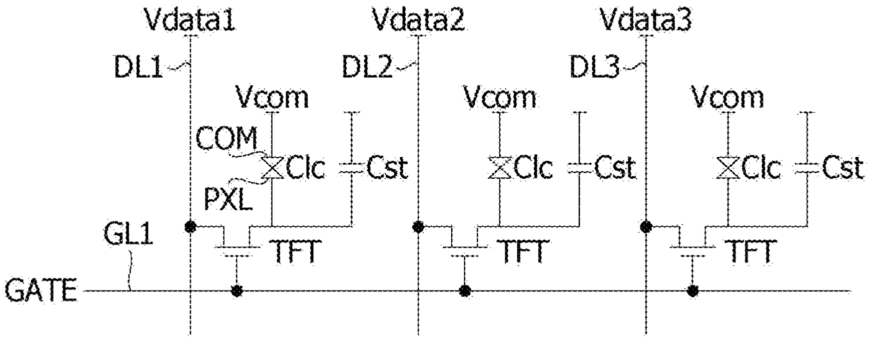
FIGS. 3 and 4 are circuit diagrams each illustrating an example of a pixel circuit according to an embodiment of the present disclosure.
Figure 4:
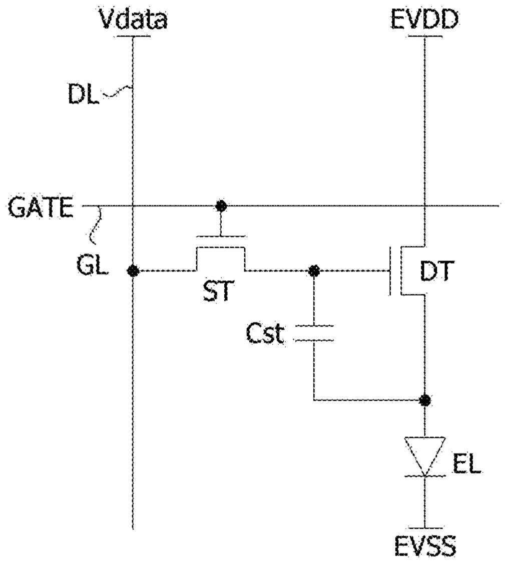

FIGS. 3 and 4 are circuit diagrams illustrating pixel circuits according to one embodiment of the present disclosure. FIG. 3 is a pixel circuit of a liquid crystal display device, and FIG. 4 is a pixel circuit of an organic light-emitting display device. It should be noted that the pixel circuit of the present disclosure is not limited to FIGS. 3 and 4.

Referring to FIG. 3, the pixel circuit includes a pixel electrode PXL, a common electrode COM, a liquid crystal cell Clc, a TFT connected to the pixel electrode PXL, and a storage capacitor Cst. The TFT is formed at an intersection of each of data lines DL1 to DL3 and a gate line GL1. The TFTs supplies data signals Vdata1 to Vdata3 received via the data lines DL1 to DL3 to the pixel electrode PXL in response to the gate pulse GATE received via the gate line GL1.

Referring to FIG. 4, the pixel circuit includes a light-emitting element E L, a driving element DT configured to supply a current to the light-emitting element EL, a switch element ST configured to supply a data signal Vdata to a gate electrode of the driving element DT in response to the gate pulse GATE, and a capacitor Cst connected between the gate electrode and a source electrode of the driving element DT. The driving element DT and the switch element ST may be implemented as TFFs.

The pixel driving voltage EVDD may be applied to a drain electrode of the driving element DT via a power line commonly connected to the pixels. The driving element DT supplies a current to the light-emitting element EL according to a gate-source voltage Vgs thereof to drive the light-emitting element EL. The switch element ST is turned on in response to the gate-on voltage VGH of the gate pulse GATE. The light-emitting element EL is turned on when a forward voltage between an anode and a cathode is greater than or equal to a threshold voltage. The pixel base voltage EVSS lower than the pixel driving voltage EVDD is applied to the cathode of the light-emitting element EL. The capacitor Cst is connected between the gate electrode and the source electrode of the driving element DT and maintains the gate-source voltage Vgs of the driving element DT.

The light-emitting element EL may be implemented as an organic light-emitting diode (OLED) including an organic compound layer formed between the anode and the cathode. The organic compound layer may include a hole injection layer HIL, a hole transport layer HTL, an emission layer EML, an electron transport layer ETL, and an electron injection layer EIL, but the present disclosure is not limited thereto. When a voltage is applied to the anode and the cathode of the OLED, holes passing through the hole transport layer HTL and electrons passing through the electron transport layer ETL move to the emission layer EML to create excitons, and thus visible light is emitted from the emission layer EML. The OLED used as the light-emitting element may have a tandem structure in which a plurality of emission layers are stacked. The OLED of the tandem structure may improve the luminance and lifespan of the pixel.

Due to process deviation and element characteristic deviation caused by the manufacturing process of the display panel, there may be a difference in the electrical characteristics of the driving elements between the pixels. This difference in the electrical characteristics of the driving elements may increase over time as the driving time of the pixels elapses. In order to compensate for the electrical characteristic deviation of the driving element between the pixels, an internal compensation circuit may be included in the pixel circuit illustrated in FIG. 4 or an external compensation circuit may be connected to the pixel circuit.

Figure 5A:
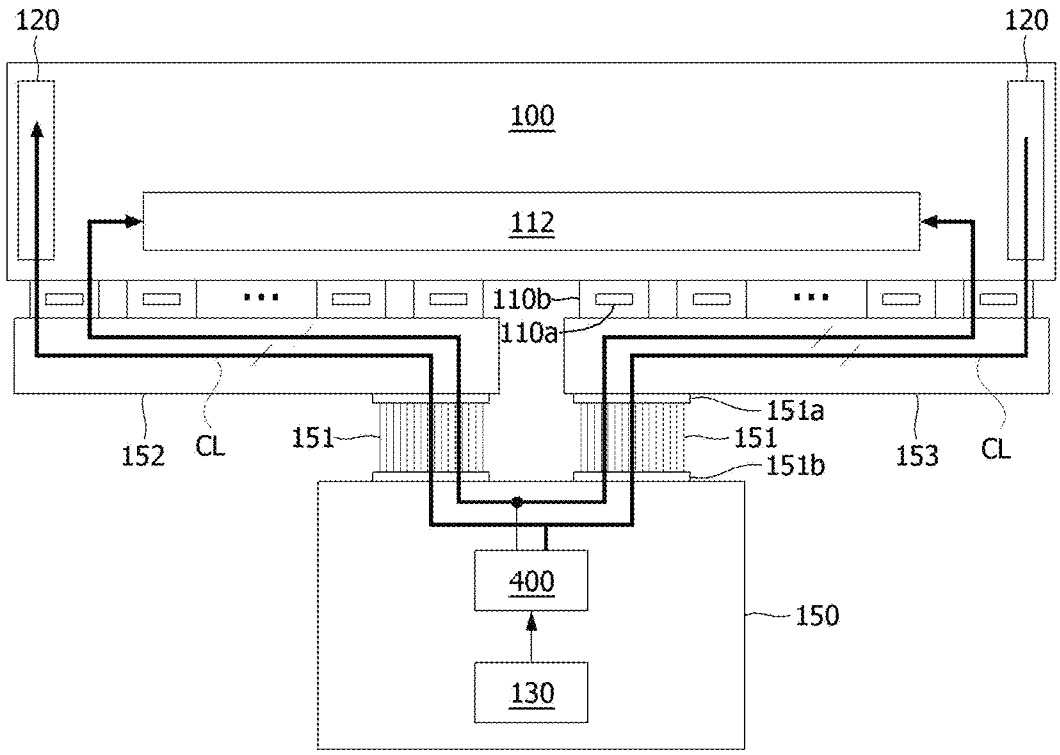
FIGS. 5A to 5C are diagrams illustrating various embodiments of a level shifter in the display device according to one embodiment of the present disclosure.
Figure 5B:
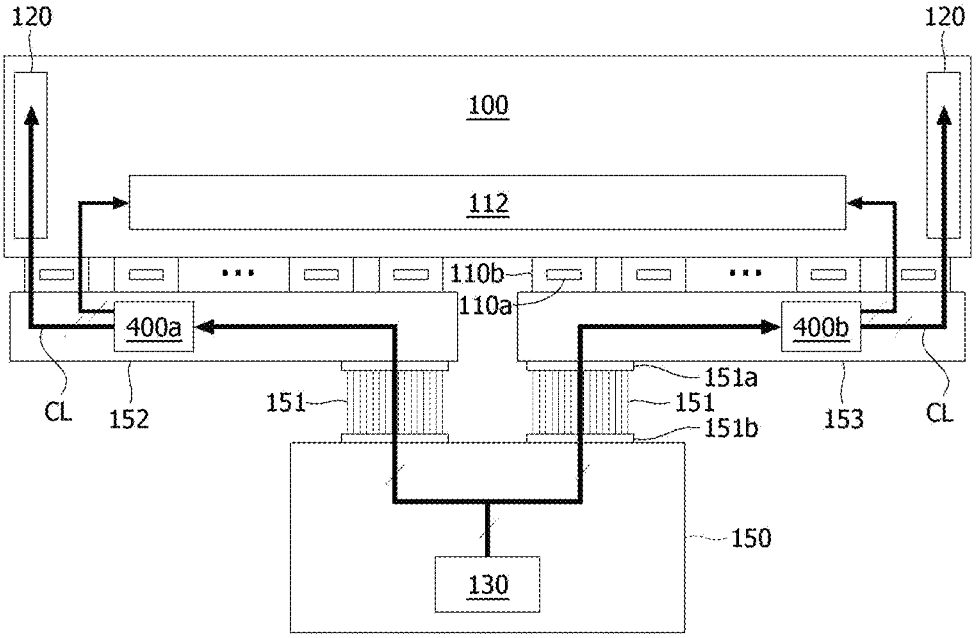
Figure 5C:
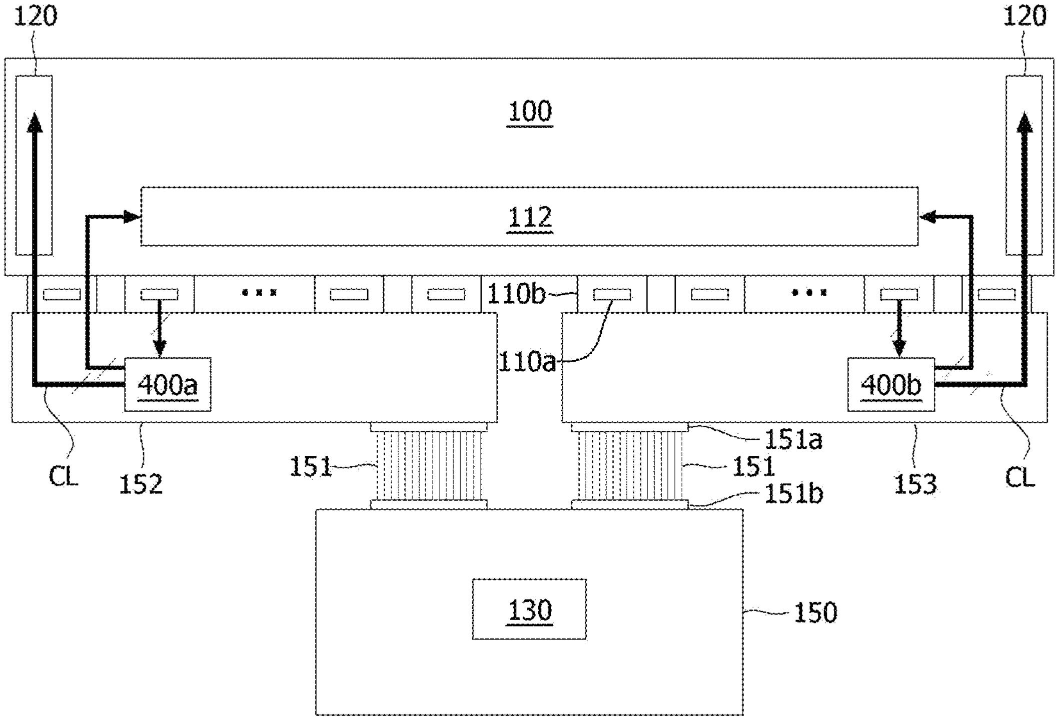

FIGS. 5A to 5C are diagrams illustrating various embodiments of the level shifter in the display device according to one embodiment of the present disclosure.

Referring to FIGS. 5A to 5C, a control board 150 may be connected to first and second source printed circuit boards (PCBs) 152 and 153 via a flexible circuit board, such as, a flexible flat cable (FFC) or a flexible printed circuit board (FPCB), and a connector 151*a*. Source driver ICs 110*a* are connected between the source printed circuit boards (PCBs) 152 and 153 and the display panel 100. The source driver IC 110*a* receives pixel data from the timing controller 130 and outputs a data signal.

The timing controller 130 and the level shifter 400 may be mounted on the control board 150 as shown in FIG. 5A. In this case, input terminals of the level shifter 400 are connected to the timing controller 130 via wirings formed on the control board 150. Output terminals of the level shifter 400 may be connected to the gate driving unit 120 via wirings connecting the flexible circuit board 151, the source PCB 152, a flexible film 110*b*, and the gate driving unit 120 on the display panel 100.

Referring to FIG. 5B, the level shifters 400*a* and 400*b* may be mounted on the first and second source printed circuit boards (PCBs) 152 and 153, respectively. In this case, the level shifters 400*a* and 400*b* include a first level shifter 400*a* mounted on the first source PCB 152 and a second level shifter 400*b* mounted on the second source PCB 153. Input terminals of level shifters 400*a* and 400*b* are connected to the timing controller 130 via wirings connecting the control board 150, the FFC 151 and the first and second source PCBs 152 and 153. Output terminals of the level shifters 400*a* and 400*b* may be connected to the gate driving unit 120 via wirings connecting the first and second source PCBs 152 and 153, the flexible film 110*b*, and the gate driving unit 120 on the display panel 100.

Referring to FIG. 5C, the level shifters 400*a* and 400*b* may be connected to the source driver ICs 110*a*. The timing controller 130 may transmit video data packets including pixel data of an input image and control packets including various pieces of control information to the source driver IC 110*a*. The timing controller 130 encodes gate timing control information into a control packet and transmits the control packet to the source driver IC 110*a*. The source driver IC 110*a* may generate a gate timing control signal from the gate timing control information and provide the gate timing control signal to the level shifters 400*a* and 400*b*.

In FIGS. 5A to 5C, the level shifters 400, 400*a*, and 400*b* may receive gate timing information transmitted from the timing controller 130 or the source driver IC 110*a* to generate an output clock. The gate timing information may include a clock, data, and a timing control signal shown in FIG. 7B. The output clock of the level shifter 400, 400*a*, or 400*b* is input to the gate driving unit 120. The gate driving unit 120 shifts the clock received from the level shifter 400, 400*a*, or 400*b* using a shift register and sequentially supplies gate pulses to the gate lines GL.

Figure 6:
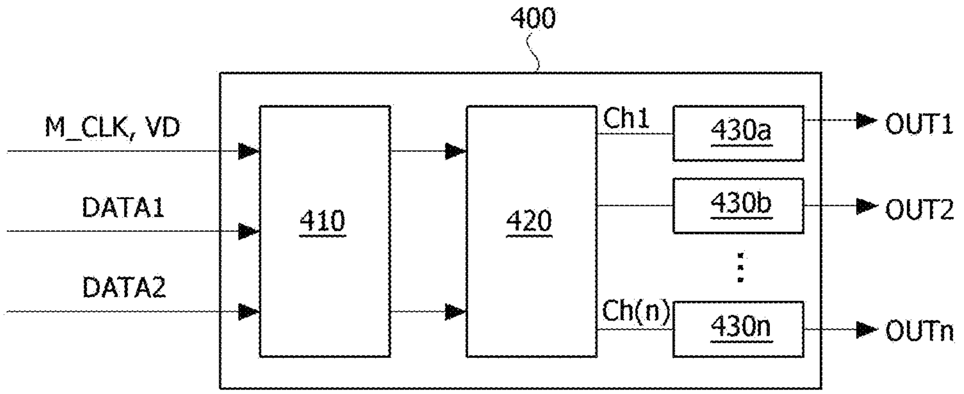
FIG. 6 is a diagram illustrating a level shifter according to a first embodiment of the present disclosure.
Figure 7A:
FIGS. 7A and 7B respectively illustrate a level shifter and a waveform diagram illustrating an example of generating an output clock in the level shifter according to the first embodiment of the present disclosure.
Figure 7B:
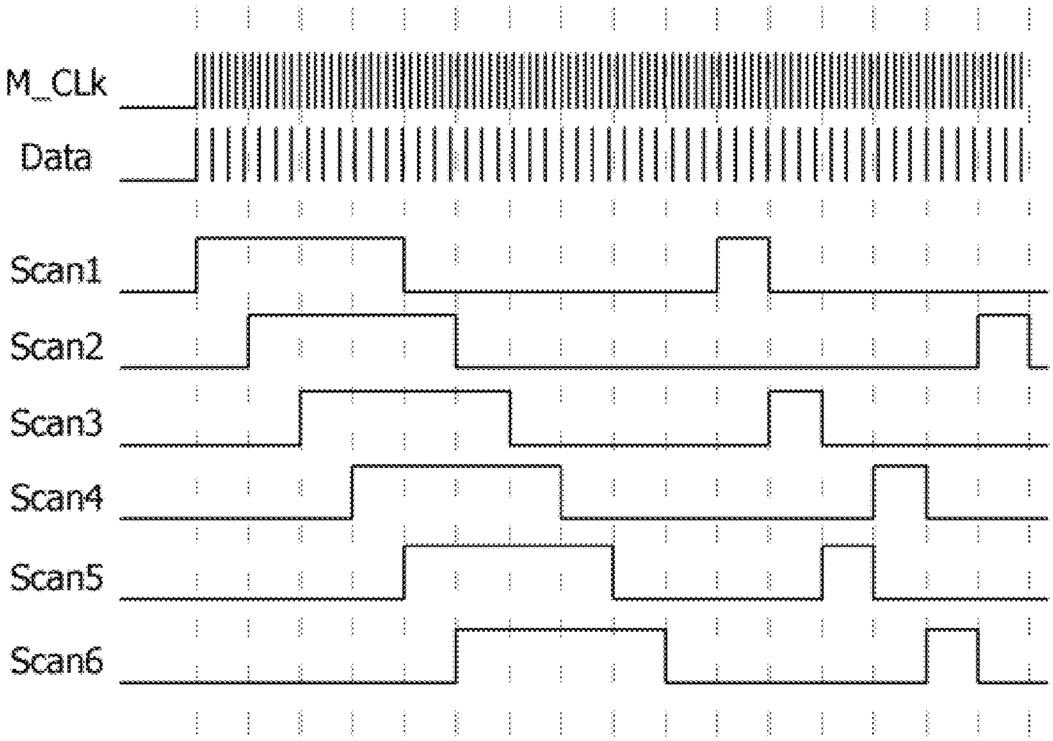
Figure 8A:
FIGS. 8A and 8B respectively illustrate a level shifter and a waveform diagram illustrating an example of generating an output clock in a conventional level shifter.
Figure 8B:
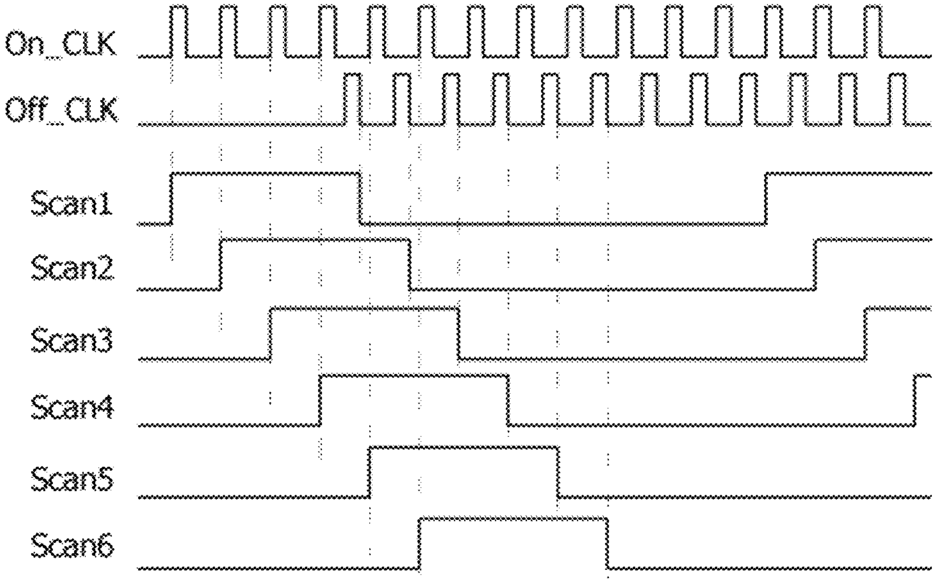

FIG. 6 is a diagram illustrating a level shifter 400 according to a first embodiment of the present disclosure. FIGS. 7A and 7B respectively illustrate a level shifter and a waveform diagram illustrating an example of a timing control signal and an output clock of the level shifter according to the first embodiment of the present disclosure. FIGS. 8A and 8B respectively illustrate a level shifter and a waveform diagram illustrating an example of a timing control signal and an output clock of a conventional level shifter.

Referring to FIG. 6, a level shifter 400 according to one embodiment of the present disclosure includes a logic unit 410 (e.g., a logic circuit) configured to receive a main clock M_CLK and control data DATA1 and DATA2 to generate an edge signal and a channel signal, and a channel selection unit 420 (e.g., a channel selection circuit) configured to apply gate control signals OUT1 to OUTn to at least one of a plurality of output units 430*a* to 430*n* according to the channel signal.

The logic unit 410 may receive the main clock M_CLK and the control data DATA1 and DATA2 from the timing controller 130. In addition, reference data VD for starting a clock count may also be received from the timing controller 130. The control data DATA1 and DATA2 and the reference data VD may be transmitted to the level shifter 400 for every one horizontal period 1H.

The main clock M_CLK comprises of a sequence of pulses in which a voltage level is inverted at regular intervals. Thus, the pulses of the main clock belonging to each horizontal period 1H have the same number.

In one embodiment, the control data DATA1 includes timing data DATA1 and control data DATA2 may include channel data DATA2. The timing data DATA1 may include rising data and falling data, and the channel data DATA2 may include data (hereinafter referred to as "rising channel data") for a channel to which a rising edge signal (hereinafter referred to as "first edge signal") is to be output and data (hereinafter referred to as "falling channel data") for a channel (hereinafter referred to as "second edge signal") to which a falling edge signal is to be output.

When the rising data and the rising channel data are input, the logic unit 410 may determine whether a value obtained by counting the main clock M_CLK from a reference time point set in the reference data VD reaches a time point defined in the rising data, and transmit the first edge signal together with the channel signal to the channel selection unit 420.

Similarly, when the falling data and the falling channel data are input, the logic unit 410 may transmit the second edge signal together with the channel signal to the channel selection unit 420 when a value obtained by counting the main clock M_CLK from the reference time point reaches a time point defined in the falling data.

As an example, when the rising data is "00011(3d)," the first edge signal may be output after counting the main clock M_CLK three times from a preset reference time point, and when the falling data is "11100(28d)," the second edge signal may be output after counting the main clock M_CLK 28 times from the preset reference time point.

Thus, by outputting the first and second edge signals at the time points defined in the timing data as shown in FIG. 7B, a pulse width and/or order of the gate control signals Scan1 to Scan6 may be freely adjusted. As shown in FIG. 7B, the scan signals Scan1 to Scan6 are not sequentially output. For example, second scan signal Scan2 is the last scan signal that is output amongst the scan signals rather than the second scan signal that is output. As another example, the fifth scan signal Scan5 is output prior to the fourth scan signal Scan4. On the other hand, the conventional clock circuit may simply shift the clock according to a difference between an on-clock signal On_CLK and an off-clock signal Off_CLK as shown in FIGS. 8A and 8B, and may not freely adjust the pulse width and/or order of the clocks as in the embodiment. Thus, in the conventional clock circuit the scan signals are sequentially output as shown in FIG. 8B.

The logic unit 410 may transmit the first and second edge signals to the channel selection unit 420 at time points defined in the timing data DATA1. At this time, the logic unit 410 may also transmit the channel signal synchronized with the edge signal.

The channel selection unit 420 may apply an output signal to at least one of a plurality of output units 430*a* to 430*n* according to the channel signal via a plurality of channels of the channel selection unit 420. In one embodiment, the channel selection unit 420 includes channels Ch1 to Ch(n). In one embodiment, each channel Ch corresponds to one output terminal of the level shifter 400.

As an example, when a signal is applied such that the gate control signal is output to a third channel among 10 channels Ch1 to Ch(n), the channel selection unit 420 may turn on a switch corresponding to the third channel to selectively apply the output signal only to a third output unit. Thereafter, when a signal is applied such that a clock is output to a fifth channel, the channel selection unit 420 may turn off the switch corresponding to the third channel and turn on a switch corresponding to the fifth channel to apply the output signal to a fifth output unit.

The plurality of output units 430*a* to 430*n* may be output buffers each having a pull-up transistor and a pull-down transistor. However, the present disclosure is not necessarily limited thereto, and various configurations capable of outputting a gate control signal according to the output signal may be applied without limitation. As an example, the plurality of output units 430*a* to 430*n* may be a plurality of switches each connected to one output buffer.

Each of the gate control signals OUT1 to OUTn is a control signal selectively output from the plurality of output units 430*a* to 430*n* and input to the gate driving unit.

The plurality of output units 430*a* to 430*n* may each include an output maintaining unit (not shown) capable of maintaining the output gate control signal for a predetermined period of time. The output maintaining unit may be connected to each of the plurality of output units 430*a* to 430*n* to maintain a signal output from each of the plurality of output units 430*a* to 430*n* for a predetermined period of time. The output maintaining unit may be disposed inside the output unit 430 or may be disposed at a front end or a rear end of the output unit 430.

The gate control signals OUT1 to OUTn output through the output units need to be maintained for a predetermined period of time to have a set width. However, in the embodiment, each channel is switched through a time division method, and thus the output maintaining unit is required to maintain the already output signal for a predetermined period of time even when the switch is turned off. This will be described later.

Unlike the present embodiment, a control circuit may be disposed in each channel. Thus, when control data is input to a first channel, the control circuit may output a signal to the output buffer at a corresponding time point according to information determined in the control data. In this case, since control data is input to each channel, separate channel data is not included.

For each channel, a predetermined number of bits are required to represent rising data and falling data, and may increase depending on the number of channels and resolution. As an example, when the number of bits for representing the rising data is five, the number of bits for representing the falling data is five, and there are 10 channels, the total number of bits is 100 ((5+5)×10).

However, according to the embodiment, the number of bits required to represent the rising data of all channels is five, the number of bits required to represent the falling data of all channels is five, the number of bits required to represent the channel information to which the rising signal is to be applied is five, and the number of bits required to represent the channel information to which the falling signal is to be applied is five. Thus, a total of 20 bits may be used to represent the information and data, which has the advantage of reducing memory. As the number of channels increases, this advantage may be further increased.

The channel selection unit 420 according to the embodiment may apply the edge signal to the selected channel by turning on the switch of the selected channel among the switches connected to the respective channels. That is, the first edge signal may be applied to the output unit 430*a* connected to the first channel at a first time point, and the second edge signal may be applied to the output unit 430*b* connected to the second channel at a second time point. With this configuration, the size of the level shifter may be reduced since the logic unit is not formed in each channel.

In addition, according to the embodiment, since the first and second edge signals are output at time points defined in the rising data and the falling data, the order and width of the clocks may be freely adjusted.

Figure 9A:
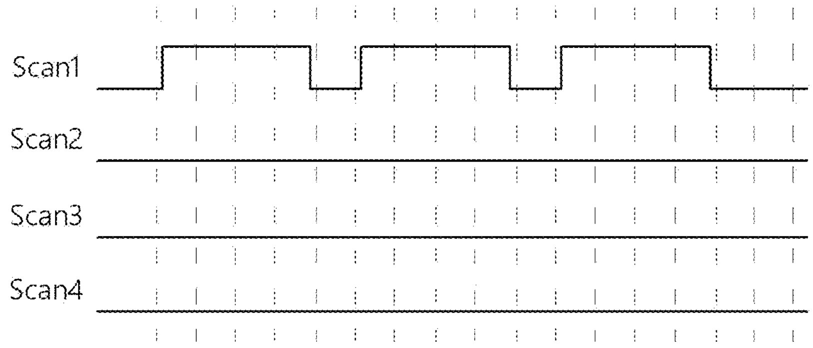
FIGS. 9A to 9D are diagrams illustrating various output clocks according to one embodiment of the present disclosure.
Figure 9B:
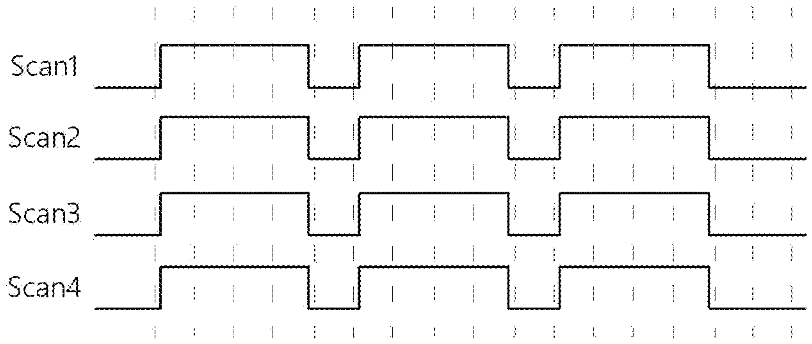

As an example, a first gate control signal Scan1 from amongst the gate control signals may be turned on and repeatedly driven as shown in FIG. 9A, and a plurality of gate control signals may be simultaneously output with the same width as shown in FIG. 9B. In this case, the channel selection unit may simultaneously designate the plurality of channels.

Figure 9C:
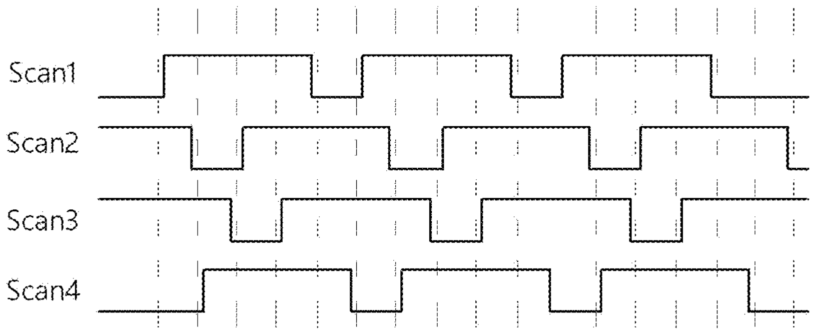
Figure 9D:
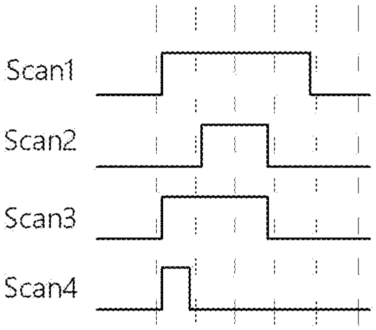

In addition, as shown in FIG. 9C, the gate control signals may be output in a non-sequential order, and the gate control signals having different widths may be simultaneously driven. Referring to FIG. 9D, the first gate control signal Scan1, a third gate control signal Scan3, and a fourth gate control signal Scan4 may rise simultaneously and the second gate control signal Scan2 may rise after the first, third, and fourth gate control signals. Subsequently, the fourth gate control signal Scan4 may fall first, and then the third gate control signal Scan3 and the first gate control signal Scan1 may sequentially fall.

According to the embodiment, an output frequency may be reduced as compared to an input frequency. On the other hand, in the case of the conventional level shifter, since the clock is simply shifted, the input frequency is the same as the output frequency, which differs from the present disclosure.

The input frequency may be determined by "frequency of one horizontal period (1H) (frame frequency×horizontal resolution)×resolution of output duty." As an example, the minimum input frequency may be a frame frequency of 60 Hz and the horizontal resolution may be a QHD (1440) level. In addition, the resolution of the output duty may be 5 bits. Thus, the input frequency may be about 2 MHz ($60\times1440\times2^5$).

In addition, the maximum input frequency may be a frame frequency of 240 Hz and the horizontal resolution may be 8K (4320). In addition, the resolution of the output duty may be 10 bits. Thus, the maximum input frequency may be about 1 GHz ($240\times4320\times2^{10}$).

On the other hand, the output frequency may be determined by a 1 horizontal period frequency, the number of H-drives (1H or 2H), or the type of signal (Scan Clock or V Sync).

As an example, when VSync (where Vsync is 60 Hz driving) is used, the maximum output frequency may be 60 Hz, and when the Scan Clock is used, the frame frequency is 240 Hz, the horizontal resolution is 8K (4320), and H-drives is 1H drive, the maximum output frequency may be about 1 MHz (240×4320).

Figure 10:
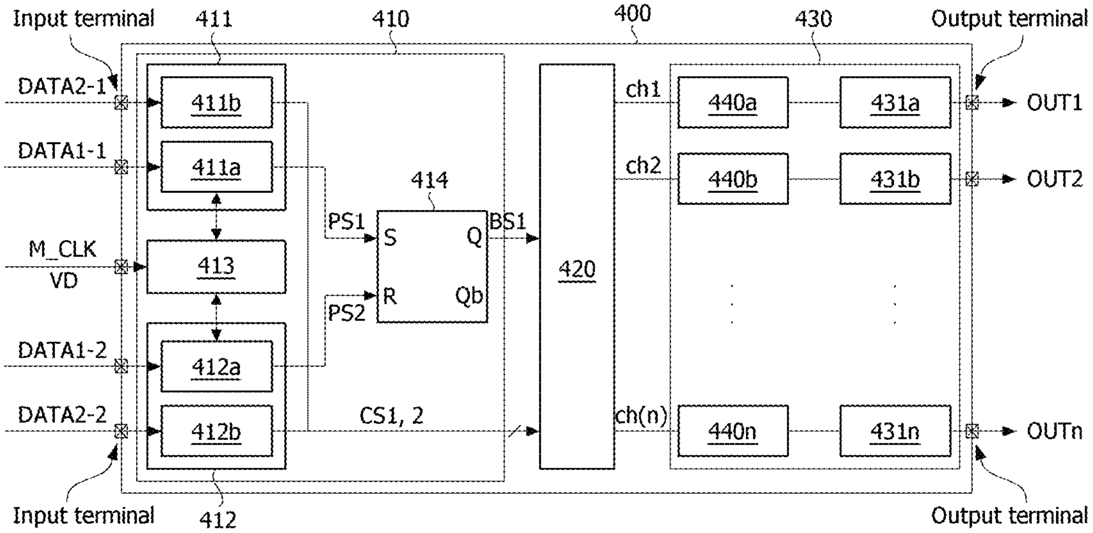
FIG. 10 is a diagram illustrating a level shifter according to a second embodiment of the present disclosure.
Figure 11:
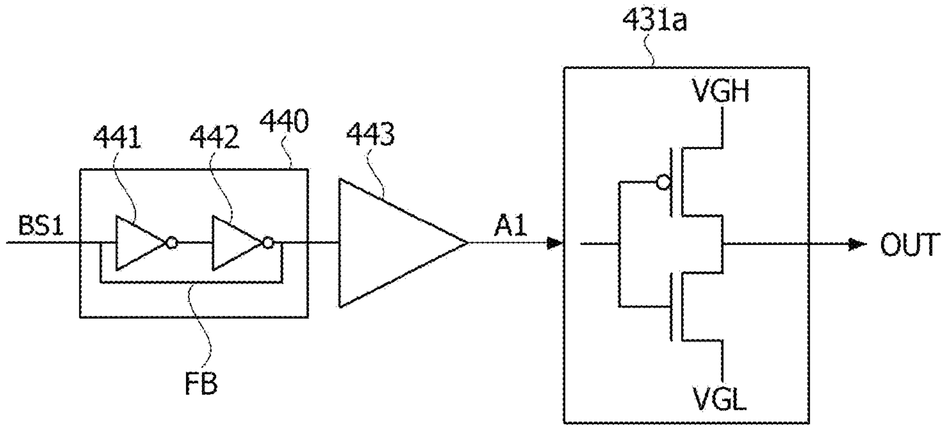
FIG. 11 is a diagram illustrating an output maintaining unit and an output unit of the present disclosure.

FIG. 10 is a diagram illustrating a level shifter according to a second embodiment of the present disclosure. FIG. 11 is a diagram illustrating an output unit according to one embodiment of the present disclosure.

Referring to FIG. 10, a logic unit 410 may include a first input/output unit 411 (e.g., first input/output circuit) to which rising data DATA1-1 and rising channel data DATA2-1 are input, and a second input/output unit 412 (e.g., second input/output circuit) to which falling data DATA1-2 and falling channel data DATA2-2 are input.

The first input/output unit 411 may include a first edge signal generation unit 411*a* (e.g., a first edge signal generation circuit 411*a*) and a first channel signal generation unit 411*b* (e.g., a first channel signal generation circuit 411*b*). The first edge signal generation unit 411*a* may output a first edge signal PS1 at a time point defined in the rising data DATA1-1. The first edge signal PS1 generated by the first input/output unit 411 may be input to a buffer control signal generation unit 414.

The first channel signal generation unit 411*b* may generate a first channel signal CS1 by selecting a channel defined in the rising channel data DATA2-1. As an example, information of each channel may be stored in advance in a memory element of the logic unit 410. Accordingly, the first channel signal generation unit 411*b* may search for a channel matching the rising channel data DATA2-1 to generate the first channel signal CS1.

The second input/output unit 412 may include a second edge signal generation unit 412*a* (e.g., a second edge signal generation circuit 412*a*) and a second channel signal generation unit 412*b* (e.g., a second channel signal generation circuit 412*b*). The second edge signal generation unit 412*a* may generate a second edge signal PS2 at a time point defined in the falling data DATA1-2. The second edge signal PS2 generated by the second input/output unit 412 may be input to the buffer control signal generation unit 414.

The second channel signal generation unit 412*b* may select a channel defined in the falling channel data DATA2-2 to generate a second channel signal CS2. As an example, information of each channel may be stored in advance in the memory element of the logic unit 410. Accordingly, the second channel signal generation unit 412*b* may search for a channel matching the falling channel data DATA2-2 to generate the second channel signal CS2.

When the rising data DATA1-1 is input, a counter 413 may count whether a value obtained by counting a main clock M-CLK from a preset reference time point reaches the time point defined in the rising data DATA1-1. In addition, when the falling data DATA1-2 is input, the counter 413 may count whether the value obtained by counting the main clock M_CLK from the preset reference time point reaches the time point defined in the falling data DATA1-2.

According to the embodiment, only the rising data may be input to the first input/output unit 411, and only the falling data may be input to the second input/output unit 412. The logic unit 410 may receive serial data from the timing controller, and a separate decoder (not shown) may divide the serial data into the rising data and the falling data and input the rising data and the falling data to the first input/output unit 411 and the second input/output unit 412, respectively. However, the present disclosure is not necessarily limited thereto, and the timing controller may process the data in advance and transmit different pieces of data to each of the first input/output unit 411 and the second input/output unit 412.

The buffer control signal generation unit 414 may output a buffer control signal BS1 when the first edge signal PS1 generated by the first input/output unit 411 and the second edge signal PS2 generated by the second input/output unit 412 are input. The buffer control signal generation unit 414 may output a first buffer control signal (high level signal) when the first edge signal PS1 is input to a first input terminal (S terminal), and output a second buffer control signal (low level signal) when the second edge signal PS2 is input to a second input terminal (R terminal). In one embodiment, the buffer control signal generation unit 414 may be a set-reset (SR) latch circuit, but the present disclosure is not necessarily limited thereto, and various configurations capable of outputting the buffer control signal according to a signal of the first input/output unit 411 and a signal of the second input/output unit 412 may be applied without limitation.

According to the embodiment, the first edge signal PS1 and the second edge signal PS2 may be separately output since the rising data DATA1-1 and the falling data DATA1-2 are separately input to the first input/output unit 411 and the second input/output unit 412, respectively. Thus, the buffer control signal generation unit 414 outputs the first buffer control signal when a signal is input from the first input/output unit 411 and outputs the second buffer control signal when a signal is input from the second input/output unit 412, which has the advantage of simplifying data processing and operation.

The first input/output unit 411 and the second input/output unit 412 may transmit the first channel signal CS1 and the second channel signal CS2 to a channel selection unit 420. The first channel signal CS1 and the second channel signal CS2 may be configured as serial data and transmitted to the channel selection unit 420. Accordingly, the channel selection unit 420 may be controlled to turn on a switch corresponding to input channel information so that the buffer control signal is input to the corresponding channel. The channel selection unit 420 may be a demultiplexer.

Referring to FIGS. 10 and 11, each of a plurality of output units 431*a* to 431*n* may be connected to the channel selection unit 420 through a plurality of output maintaining units 440, and the buffer control signal BS1 may be selectively input thereto. Each output maintaining unit 440 is connected to a corresponding one of the output units 431*a* to 431*n*. The plurality of output units 431*a* to 431*n* may convert voltages of the buffer control signal BS1 into a gate-on voltage VGH and a gate-off voltage VGL.

Each of the output units 431*a* to 431*n* may include a pull-up transistor configured to convert a high-level H of an output signal A1 into the gate-on voltage VGH, and a pull-down transistor configured to convert a low level L of the output signal A1 into the gate-off voltage VGL.

A first output maintaining unit 440*a* from the plurality of output maintaining units 440 may serve to maintain a gate control signal output from the output unit 431*a* a predetermined period of time. Accordingly, even when the channel selection unit 420 blocks the buffer control signal BS1 applied to the corresponding output unit, the gate control signal may be maintained for the predetermined period of time. Accordingly, a pulse width can be adjusted by maintaining the gate control signal until the buffer control signal is again applied later to the corresponding output unit.

Each first output maintaining unit 440 may include a pair of NOT gates 441 and 442. Accordingly, when a high-level signal ("1") is applied to a first NOT gate 441, a low level signal ("0") is output, and the output low level signal ("0") is converted into the high level signal ("1") again by a second NOT gate 442 and input to a first buffer 443. At this time, the signal output from the second NOT gate 442 may be input to the first NOT gate 441 again via a feedback line FB, thereby maintaining the output signal for a predetermined period of time. The first buffer 443 may convert the applied buffer control signal into a voltage level capable of driving the pull-up transistor and the pull-down transistor.

In the embodiment, the first NOT gate 441 is illustrated as a first logic circuit element, and the second NOT gate 442 is illustrated as a second logic circuit element, but the present disclosure is not necessarily limited thereto. In addition to the aforementioned configuration, various circuits capable of maintaining the buffer control signal for a predetermined period of time may be applied.

Figure 12:
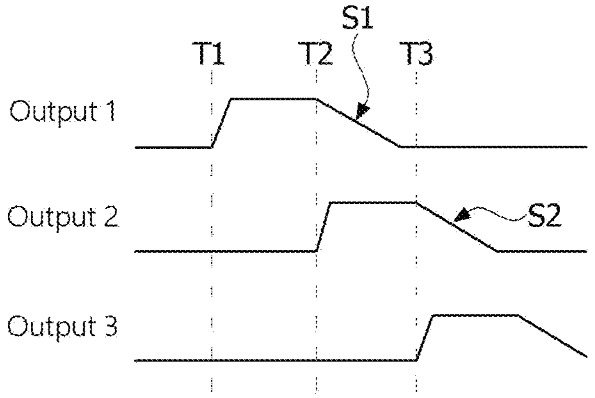
FIG. 12 is a diagram illustrating a state in which a voltage is naturally discharged as a channel is changed.
Figure 13:
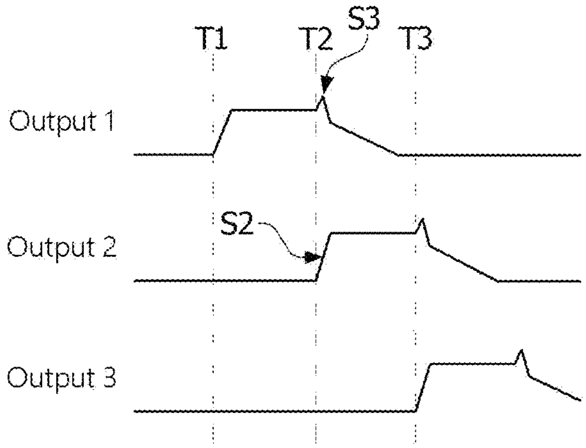
FIG. 13 is a diagram illustrating a state in which a coupling phenomenon occurs as a signal is applied to an adjacent channel.
Figure 14:
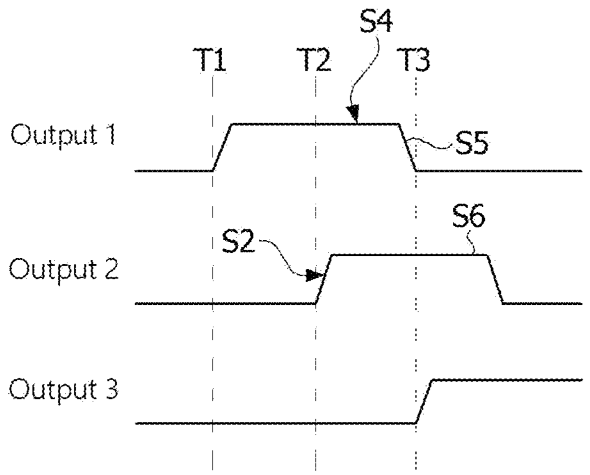
FIG. 14 is a diagram illustrating a state in which a voltage of a channel to which a signal is previously applied is constantly maintained even when the channel is changed and an output is generated in the adjacent channel.

FIG. 12 is a diagram illustrating a state in which a voltage is discharged as a channel is changed according to one embodiment. FIG. 13 is a diagram illustrating a state in which a coupling phenomenon occurs as a signal is applied to an adjacent channel according to one embodiment. FIG. 14 is a diagram illustrating a state in which a voltage is constantly maintained even when the channel is changed and an output is generated in the adjacent channel according to one embodiment.

According to the embodiment, the gate control signals applied to the plurality of output units 431*a* to 431*n* are switched at high speed by the channel selection unit 420. Accordingly, without the first output maintaining unit 440, the voltage of the gate control signal may be naturally discharged over time. As an example, as shown in FIG. 12, when a first channel is connected at a first time point T1 and a first gate control signal Output1 is applied, the remaining channels may be floated. However, when a second channel is selected at a second time point T2 and a second gate control signal Output2 is output, the first channel is floated and the voltage of the first gate control signal Output1 is naturally discharged (S1). The voltage of the second gate control signal Output2 is also floated and naturally discharged (S2) when a third gate control signal Output3 is output at a third time point T3.

In addition, when a line capacitor is formed due to a narrow gap between output lines, as shown in FIG. 13, a coupling occurs (S3) when a signal is output to the immediately adjacent line in a state in which the unselect channel is floated. As an example, when the second channel is selected at the second time point T2 and the second gate control signal Output2 is output, a coupling occurs in the first gate control signal Output1. A coupling also occurs in the second gate output signal Output2 when the third gate control signal Output3 is output at the third time point T3.

However, referring to FIG. 14, in the embodiment, the voltage level is maintained (S4) by the output maintaining unit 140 for a predetermined period of time even though the first channel Ch1 is no longer selected and the second channel Ch2 is selected and the second gate output signal Output2 is output. In addition, since the voltage is constantly maintained for a predetermined period of time, the coupling phenomenon may be reduced even when a voltage is applied (S2) to the adjacent channel. In addition, even when the voltage in the adjacent channel is turned off (S5), the coupling phenomenon is reduced, so that the voltage level is maintained (S6). According to the embodiment, the channel selection unit can maintain an output even in a section at which the corresponding channel is not selected.

Figure 15:
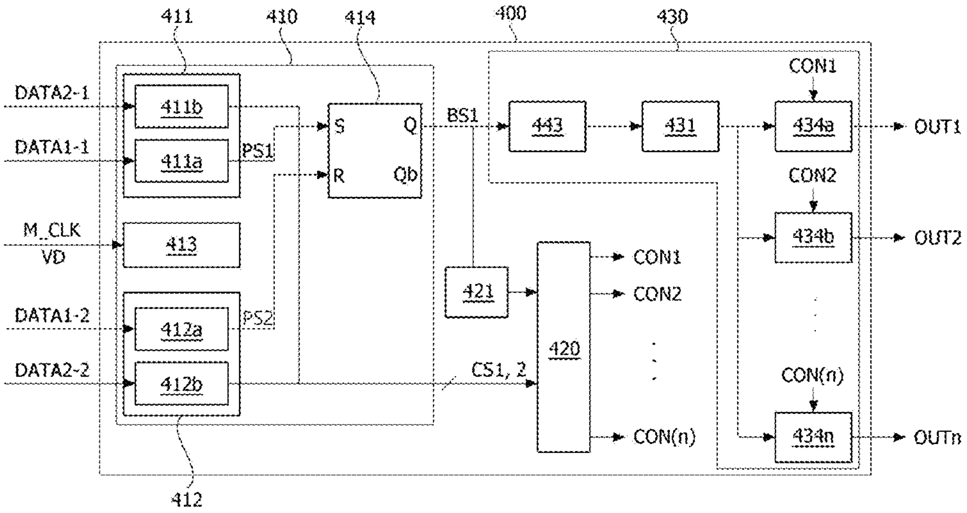
FIG. 15 is a diagram illustrating a level shifter according to a third embodiment of the present disclosure.

FIG. 15 is a diagram illustrating a level shifter according to a third embodiment of the present disclosure.

Referring to FIG. 15, a logic unit 410 may include a first input/output unit 411 (e.g., a first input/output circuit) to which rising data DATA1-1 and rising channel data DATA2-1 are input, and a second input/output unit 412 (e.g., second input/output circuit) to which falling data DATA1-2 and falling channel data DATA2-2 are input.

The first input/output unit 411 may include a first edge signal generation unit 411*a* (e.g., a first edge signal generation circuit) and a first channel signal generation unit 421*b* (e.g., a first channel signal generation circuit). The first edge signal generation unit 411*a* may generate a first edge signal PS1 at a time point defined in the rising data DATA1-1. The first edge signal PS1 generated by the first input/output unit 411 may be input to a buffer control signal generation unit 414.

The first channel signal generation unit 411*b* may generate a first channel signal CS1 by selecting a channel defined in the rising channel data DATA2-1. As an example, information of each channel may be stored in advance in the logic unit 410. Accordingly, the first channel signal generation unit 421*b* may search for a channel matching the rising channel data DATA2-1 to generate the first channel signal CS1.

The second input/output unit 412 (e.g., second input/output circuit) may include a second edge signal generation unit 412*a* (e.g., second edge signal generation circuit) and a second channel signal generation unit 412*b* (e.g., second channel signal generation circuit). The second edge signal generation unit 412*a* may generate a second edge signal PS2 at a time point defined in the falling data DATA1-2. The second edge signal PS2 generated by the second input/output unit 412 may be input to the buffer control signal generation unit 414.

The second channel signal generation unit 412*b* may select a channel defined in the falling channel data DATA2-2 to generate a second channel signal CS2. As an example, information of each channel may be stored in advance in the memory of the logic unit 410. Accordingly, the second channel signal generation unit 412*b* may search for a channel matching the falling channel data DATA2-2 to generate the second channel signal CS2.

When the rising data DATA1-1 is input, a counter 413 may count whether a value obtained by counting a main clock M_CLK from a preset reference time point reaches the time point defined in the rising data DATA1-1. In addition, when the falling data DATA1-2 is input, the counter 413 may count whether the value obtained by counting the main clock M_CLK from the preset reference time point reaches the time point defined in the falling data DATA1-2.

The buffer control signal generation unit 414 may output a buffer control signal BS1 when the first edge signal PS1 generated by the first input/output unit 411 and the second edge signal PS2 generated by the second input/output unit 412 are input. The buffer control signal generation unit 414 may output a first buffer control signal (high level signal) when the first edge signal PS1 is input to the first input terminal (S terminal), and output a second buffer control signal (low level signal) when the second edge signal PS2 is input to the second input terminal (R terminal). The buffer control signal generation unit 414 may be an SR latch circuit, but the present disclosure is not necessarily limited thereto, and various configurations capable of outputting the buffer control signal according to a signal of the first input/output unit 411 and a signal of the second input/output unit 412 may be applied without limitation.

According to the embodiment, a rising signal and a falling signal may be separately output since the rising data DATA1-1 and the falling data DATA1-2 are separately input to the first input/output unit 411 and the second input/output unit 412, respectively. Thus, the buffer control signal generation unit 414 outputs the first buffer control signal when a signal is input from the first input/output unit 411 and outputs the second buffer control signal when a signal is input from the second input/output unit 412, which has the advantage of simplifying data processing and operation.

Figure 16:
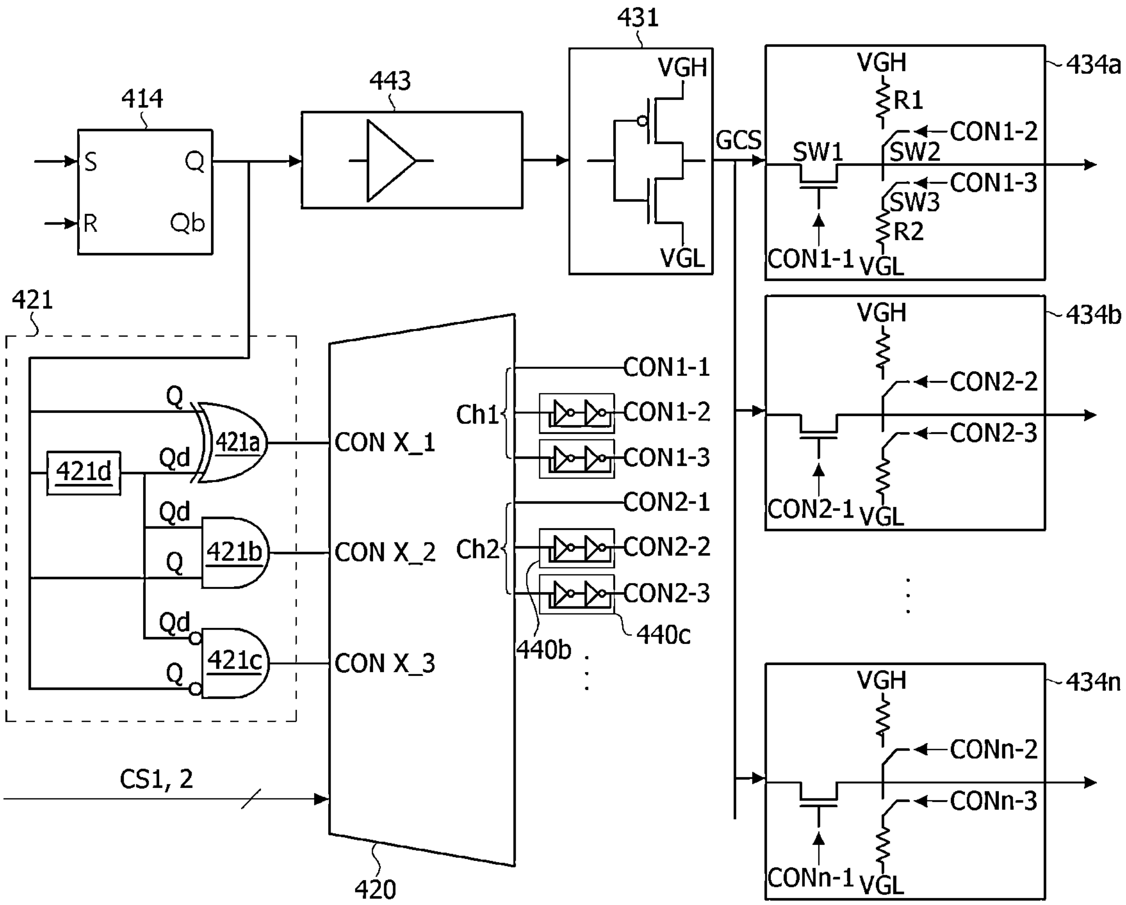
FIG. 16 is a diagram illustrating a configuration of a channel selection unit, a switch control unit, and an output unit according to one embodiment of the present disclosure.

Referring to FIGS. 15 and 16, the buffer control signal output from the buffer control signal generation unit 414 may be converted into a voltage level through a first buffer 443 and input to an output buffer 431. The output buffer 431 converts a voltage of the output signal of the first buffer 443 into a gate-on voltage VGH and a gate-off voltage VGL. The output buffer 431 includes a pull-up transistor that converts a high-level H of the output signal to the gate-on voltage VGH, and a pull-down transistor that converts a low level L of the output signal to the gate-off voltage VGL.

The output buffer 431 may be connected to a plurality of output units 434*a* to 434*n*. Accordingly, a gate control signal GCS of the output buffer 431 may be applied to the plurality of output units 434*a* to 434*n*. A voltage of the gate control signal GCS may be the gate-on voltage or the gate-off voltage.

Each of the plurality of output units 434*a* to 434*n* may include a first switch SW1 connected to the output buffer 431. Thus, the output unit in which the first switch SW1 is turned on by the channel selection unit 420 may output the gate control signal GCS of the output buffer 431.

Each of the plurality of output units 434*a* to 434*n* may include a pull-up resistor R1 and a pull-down resistor R2. One end of the pull-up resistor R1 may be connected to the gate-on voltage VGH and the other end of the pull-up resistor R1 may be connected to a second switch SW2. Thus, when the second switch SW2 is turned on, the gate-on voltage VGH may be output.

One end of the pull-down resistor R2 may be connected to the gate-off voltage VGL, and the other end of the pull-down resistor R2 may be connected to a third switch SW3. Thus, when the third switch SW3 is turned on, the gate-off voltage may be output.

The pull-up resistor R1 and the pull-down resistor R2 may maintain a level of the gate control signal for a predetermined period of time by outputting the gate-on voltage or the gate-off voltage even when the first switch SW1 is turned off.

According to the embodiment, the number of transistors can be reduced by using only one output buffer. When each of the output units, which connected to each channel, is composed of pull-up/pull-down transistors, 20 transistors are required for 10 channels. However, according to the embodiment, since the output unit connected to each channel requires only one transistor (the first switch), the number of transistors can be reduced.

The first input/output unit 411 and the second input/output unit 412 may transmit the channel signals CS1 and CS2 along with the first edge signal and the second edge signal to the channel selection unit 420. Accordingly, the channel selection unit 420 may connect a channel Ch1 or Ch2 corresponding to the input channel signal and apply control signals CON1-1, CON1-2, and CON1-3, or CON2-1, CON2-2, and CON2-3 for the first to third switches SW1, SW2, and SW3 to the corresponding channel. The channel selection unit 420 may be a demultiplexer.

A switch control unit 421 (e.g., a switch control circuit) may be disposed between the buffer control signal generation unit 414 and the channel selection unit 420. When the channel Ch1 or Ch2 is selected by the channel selection unit 420, the switch control unit 421 may output the signals CON X_1, CON X_2, and CON X_3 for controlling the first to third switches SW1, SW2, and SW3 of the selected channel.

The switch control unit 421 may control the switching operation of the channel selection unit 420 such that the output signal can be maintained even when the channel is changed after the output signal is applied to the selected channel.

The switch control unit 421 may include a plurality of logic circuit elements for outputting an AND operation result obtained by applying the output signal of the buffer control signal generation unit 414 and a delay signal of the output signal.

Figure 17:
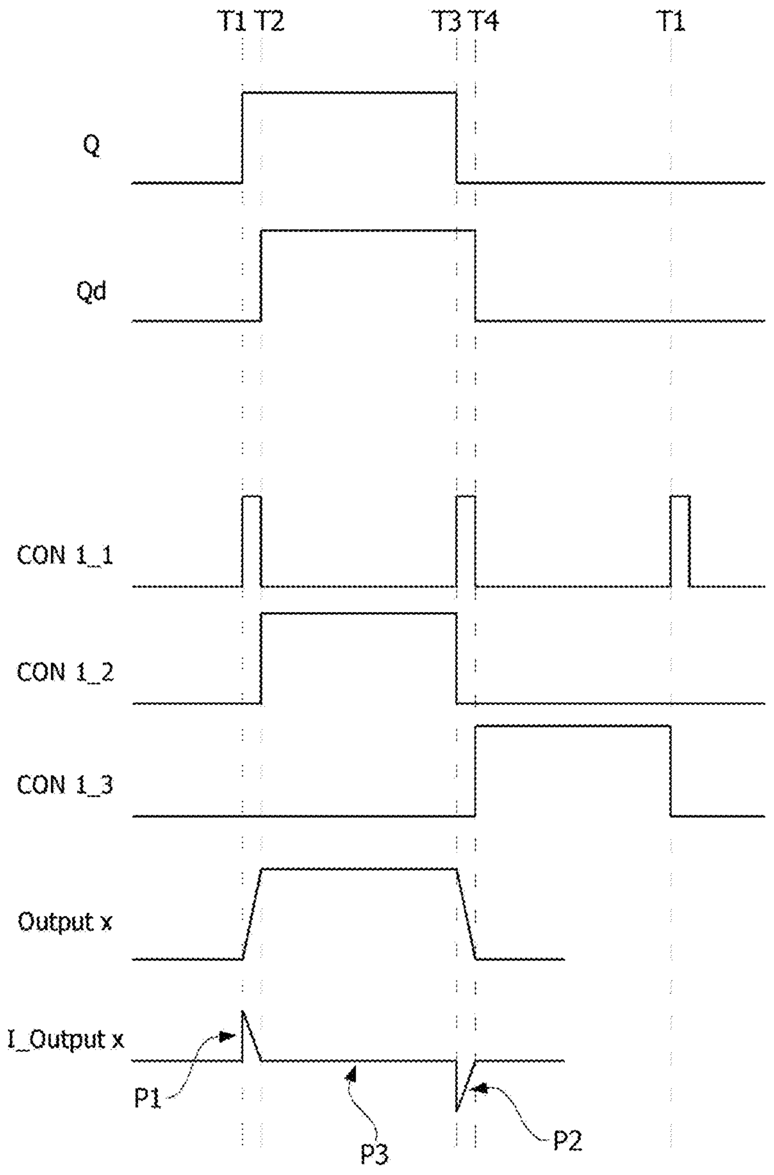
FIG. 17 is a diagram illustrating output waveforms by a control signal of the switch control unit according to one embodiment of the present disclosure.
Figures 18, 19:
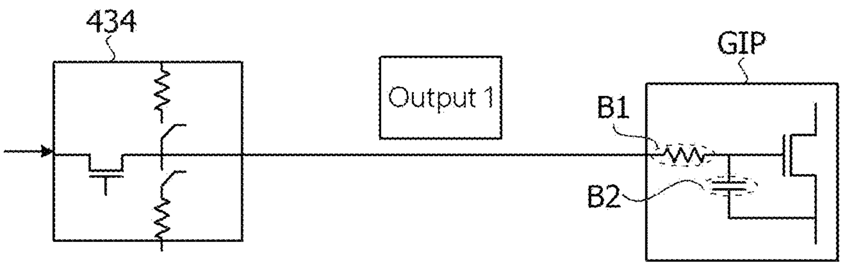
FIG. 18 is a truth table of logic circuits constituting the switch control unit according to one embodiment of the present disclosure.
FIG. 19 is a view illustrating a reason why a large amount of heat is not generated even when pull-up and pull-down resistors are used according to one embodiment of the present disclosure.

FIG. 16 is a diagram illustrating a configuration of the channel selection unit, the switch control unit, and the output unit. FIG. 17 is a diagram illustrating output waveforms by the control signals of the switch control unit. FIG. 18 is a truth table of the logic circuits constituting the switch control unit.

Referring to FIGS. 16 to 18, the switch control unit 421 may include three logic circuit elements 421*a*, 421*b*, and 421*c*, to each of which a first input signal Q and a second input signal Qd may be input. The first input signal Q is the buffer control signal of the buffer control signal generation unit 414, and the second input signal Qd is a signal obtained by delaying the first input signal Q by a delay unit 421*d*. The second input signal Qd may be delayed by a predetermined interval (an interval between T1 and T2) from the first input signal Q and may be input to each logic circuit element. As the delay unit 421*d*, any configuration that delays a signal at a predetermined interval may be applied without limitation. As an example, the delay unit 421*d* may be a resistor-capacitor (RC) circuit.

As an example, a third logic circuit element 421*a* may be an XOR gate, a fourth logic circuit element 421*b* may be an AND gate, and a fifth logic circuit element 421*c* may be a NOR gate. However, the present disclosure is not necessarily limited thereto, and the type and number of the gates may be variously combined.

At a first time point T1, the first input signal Q is a high-level signal ("1") and the second input signal Qd is a low level signal ("0"). Thus, the first switch SW1 is turned on since the third logic circuit element 421*a* outputs CON1-1 of the high-level signal. Accordingly, the gate control signal of the output buffer 431 is output. The fourth logic circuit element 421*b* and the fifth logic circuit element 421*c* output CON1-2 and CON1-3 of the low-level signal, respectively, so the second switch SW2 and the third switch SW3 may remain in the turn-off state.

At a second time point T2, both the first input signal Q and the second input signal Qd are high level signals ("1"). Accordingly, the first switch SW1 is turned off as the third logic circuit element 421*a* outputs CON1-1 of the low-level signal, and the second switch SW2 is turned on as the fourth logic circuit element 421*b* outputs CON1-2 of the high-level signal, so that the gate on voltage VGH of the pull-up resistor R1 is output. Since the fifth logic circuit element 421*c* outputs CON1-3 of the low-level signal, the third switch SW3 may remain in the turn-off state. A second output maintaining unit 440*b* (e.g., a second output maintaining circuit) may be disposed between the channel selection unit 420 and the second switch SW2, so that the second switch SW2 may remain in the turn-on state until a signal is input again even when the corresponding channel is subsequently turned off by the channel selection unit 420. The second output maintaining unit 440*b* may include two NOT gates and a feedback line as described with reference to FIG. 11.

At a third time point T3, the first input signal Q is the low-level signal ("0") and the second input signal Qd is still the high level signal ("1") by the delay unit 421*d*. Thus, the third logic circuit element 421*a* may output CON1-1 of the high-level signal. Accordingly, the first switch is turned on to output the gate control signal (gate-off voltage) of the output buffer 431. Since the fourth logic circuit element 421*b* outputs CON1-2 of the low-level signal, the second switch SW2 may be turned off. In addition, since the fifth logic circuit element 421*c* outputs CON1-3 of the low level signal, the third switch SW3 may remain in the turn-off state.

At a fourth time point T4, both the first input signal Q and the second input signal Qd are low level signals ("0"). Accordingly, the first switch SW1 and the second switch SW2 may be turned off since the third logic circuit element 421*a* and the fourth logic circuit element 421*b* output CON1-1 and CON1-2 of the low-level signal, respectively. Since the fifth logic circuit element 421*c* outputs CON1-3 of the high-level signal, the third switch SW3 may be turned on. Accordingly, after the fourth time point T4, the gate-off voltage VGL is supplied at a constant level as the third switch SW3 is turned on. A third output maintaining unit 440*c* may be disposed between the channel selection unit 420 and the third switch SW3, so that the third switch SW3 may remain in the turn-on state until a signal is input again even when the corresponding channel is subsequently turned off by the channel selection unit 420. The third output maintaining unit 440*c* may include two NOT gates and a feedback line as described with reference to FIG. 11.

According to the embodiment, the gate control signal Output x may be maintained constant with a predetermined width from the time point T1 to the time point T4 by the third to fifth logic circuit elements.

FIG. 19 is a diagram illustrating a reason why a large amount of heat is not generated even when resistors are used.

Referring to FIGS. 17 and 19, a gate-in panel (GIP) circuit of the panel may be converted to a resistor B1 and a capacitance B2 connected in series. Accordingly, after a time point of charging/discharging for the capacitance B2, in the capacitance B2, almost no current flows and only an operation for maintaining the voltage is performed.

That is, the current flows when charging (P1) the capacitance with a positive voltage and then almost no current flows (P3) when the charging of the capacitance is finished. In addition, the current flows when charging (P2) the capacitance with a negative voltage and then almost no current flows when the charging of the capacitance is finished.

Thus, since almost no current flows during the pull-up or pull-down operation using the resistors in the voltage maintenance section, there is no problem in heating even when the pull-up resistor and the pull-down resistor are disposed in the plurality of output units.

Since the content of the present disclosure described in the problems to be solved, the problem-solving means, and effects does not specify essential features of the claims, the scope of the claims is not limited to matters described in the content of the disclosure.

According to an embodiment, by reducing the number of memories and output buffers, manufacturing costs can be reduced and low-power driving is possible.

In addition, by freely adjusting a clock timing, a pixel driving method can be diversified, and a degree of freedom in design of a high-resolution display device can be increased.

Effects of the present disclosure will not be limited to the above-mentioned effects and other unmentioned effects will be clearly understood by those skilled in the art from the following claims.

While the embodiments of the present disclosure have been described in detail above with reference to the accompanying drawings, the present disclosure is not necessarily limited to these embodiments, and various changes and modifications may be made without departing from the technical spirit of the present disclosure. Accordingly, the embodiments disclosed herein are to be considered descriptive and not restrictive of the technical spirit of the present disclosure, and the scope of the technical spirit of the present disclosure is not limited by these embodiments. Accordingly, the above-described embodiments should be understood to be exemplary and not limiting in any aspect. The scope of the present disclosure should be construed by the appended claims, and all technical spirits within the scopes of their equivalents should be construed as being included in the scope of the present disclosure.

What is claimed is:

1. A level shifter comprising:

at least one input terminal;

a plurality of output terminals;

a logic circuit configured to receive timing data defining a time point and channel data via the at least one input terminal, and output an edge signal at the time point defined in the timing data and a channel signal based on the channel data; and a channel selection circuit connected to the logic circuit and including a plurality of channels that each correspond to one of the plurality of output terminals, the channel selection circuit configured to receive the edge signal and the channel signal, select a channel from the plurality of channels according to the channel signal, and output the edge signal to the selected channel, wherein a gate control signal that is based on the edge signal is output by the level shifter to a gate driving circuit that is connected to the level shifter via an output terminal from the plurality of output terminals that corresponds to the selected channel.

2. The level shifter of claim 1, wherein the timing data includes rising data and falling data, and the channel data includes rising channel data that specifies the channel from the plurality of channels to which a rising edge is to be input and falling channel data that specifies a channel from the plurality of channels to which a falling edge is to be input.

3. The level shifter of claim 2, wherein the logic circuit comprises:

a first input/output circuit configured to receive the rising data and the rising channel data; and a second input/output circuit configured to receive the falling data and the falling channel data, wherein the first input/output circuit generates a first edge signal and a first channel signal at a time point defined in the rising data, and the second input/output circuit generates a second edge signal and a second channel signal at a time point defined in the falling data.

4. The level shifter of claim 3, further comprising:

a buffer control signal generation circuit connected to the first input/output circuit and the second input/output circuit, the buffer control signal generation circuit configured to output a buffer control signal, wherein the buffer control signal is a first buffer control signal responsive to the buffer control signal generation circuit receiving the first edge signal from the first input/output circuit, and the buffer control signal is a second buffer control signal responsive to receiving the second edge signal from the second input/output circuit.

5. The level shifter of claim 4, further comprising:

an output buffer configured to output a gate control signal according to the buffer control signal; and a plurality of output circuits connected to the output buffer and the channel selection circuit.

6. The level shifter of claim 5, wherein each of the plurality of output circuits includes a first switch connected to the output buffer, and the channel selection circuit is configured to turn on at least one of first switches of the plurality of output circuits according to the first channel signal or the second channel signal.

7. The level shifter of claim 6, wherein each of the plurality of output circuits comprises:

a pull-up resistor having a first end connected to a gate-on voltage and a second end connected to a second switch; and a pull-down resistor having a first end connected to a gate-off voltage and a second end connected to a third switch.

8. The level shifter of claim 7, further comprising:

a switch control circuit connected between the buffer control signal generation circuit and the channel selection circuit, the switch control circuit configured to control the first switch, the second switch, and the third switch included in each of the plurality of output circuits according to the buffer control signal of the buffer control signal generation circuit, wherein the channel selection circuit outputs control signals for the first switch to the third switch to the selected output circuit.

9. The level shifter of claim 8, wherein the switch control circuit comprises:
a third logic circuit element configured to output a signal that controls the first switch according to the buffer control signal;
a fourth logic circuit element configured to output a signal that controls the second switch according to the buffer control signal;
a fifth logic circuit element configured to output a signal that controls the third switch according to the buffer control signal; and
a delay circuit configured to delay the buffer control signal to generate a delay signal, and output the delay signal to the third logic circuit element to the fifth logic circuit element.

10. The level shifter of claim 7, comprising:
a second output maintaining circuit between the channel selection circuit and the second switch, the second output maintaining circuit connected to the second switch; and
a third output maintaining circuit between the channel selection circuit and the third switch, the third output maintaining circuit connected to the third switch;
wherein the second output maintaining circuit maintains a turn-on state of the second switch for a predetermined period of time while the second switch is turned on, and the third output maintaining circuit maintains a turn-on state of the third switch for a predetermined period of time while the third switch is turned on.

11. The level shifter of claim 10, wherein each of the second output maintaining circuit and the third output maintaining circuit includes:
a first logic circuit element configured to invert a control signal and output a first signal based on the inverted control signal;
a second logic circuit element configured to receive the first signal from the first logic circuit, invert the first signal, and output a second signal; and
a feedback line connected to the second logic circuit element and the first logic circuit element, the feedback line configured to output the second signal output from the second logic circuit element to the first logic circuit element.

12. The level shifter of claim 1, further comprising:
a plurality of first output maintaining circuits, each first output maintaining circuit connected a corresponding channel from the plurality of channels; and
a plurality of output circuits, each output circuit connected to a corresponding first output maintaining circuit from the plurality of first output maintaining circuits and to an output terminal from the plurality of output terminals that corresponds to the channel that is connected to the corresponding first output maintaining circuit,
wherein each of the plurality of first output maintaining circuits maintains a level of a gate control signal output from the output circuit that is connected to the first output maintaining circuit for a predetermined period of time.

13. The level shifter of claim 12, wherein each of the plurality of first output maintaining circuits includes:
a first logic circuit element configured to receive a signal from the channel selection circuit, invert the signal, and output a first signal based on the inverted signal;
a second logic circuit element configured to receive the first signal from the first logic circuit element, invert the first signal, and output a second signal based on the inverted first signal; and
a feedback line connected to an output of the second logic circuit element and to an input of the first logic circuit element.

14. The level shifter of claim 13, further comprising:
a first buffer connected to the second logic circuit element, the first buffer configured to convert the second signal from the second logic circuit element to a voltage level and transmit the voltage level to the output circuit that is connected to the first output maintaining circuit.

15. A display device comprising:
a display panel including a plurality of pixel circuits, wherein each of the plurality of pixel circuits is connected to a data line and a gate line;
a data driving circuit configured to output a data signal that is applied to the data line;
a gate driving circuit configured to receive a gate control signal and supply a gate signal to the gate line; and
a level shifter configured to supply the gate control signal to the gate driving circuit,
wherein level shifter comprises:
at least one input terminal;
a plurality of output terminals;
a logic circuit configured to receive timing data defining a time point and channel data via the at least one input terminal, and output an edge signal at the time point defined in the timing data and a channel signal based on the channel data; and
a channel selection circuit connected to the logic circuit and including a plurality of channels that each correspond to one of the plurality of output terminals, the channel selection circuit configured to receive the edge signal and the channel signal, select a channel from the plurality of channels according to the channel signal, and output the edge signal to the selected channel,
wherein the gate control signal that is based on the edge signal is output by the level shifter to a gate driving circuit that is connected to the level shifter via an output terminal from the plurality of output terminals that corresponds to the selected channel.

16. The display device comprising of claim 15, wherein the timing data includes rising data and falling data, and the channel data includes rising channel data that specifies the channel from the plurality of channels to which a rising edge is to be input and falling channel data that specifies a channel from the plurality of channels to which a falling edge is to be input.

17. A level shifter comprising:
at least one input terminal;
a plurality of output terminals including a first output terminal and a second output terminal that is arranged after the first output terminal;
a logic circuit configured to receive first timing data defining a first time point and first channel data via the at least one input terminal, and output a first edge signal at the first time point defined in the first timing data and a first channel signal based on the first channel data; and
a channel selection circuit connected to the logic circuit and including a plurality of channels that are sequentially arranged and each channel corresponding to one of the plurality of output terminals, the plurality of channels includes a first channel corresponding to the first output terminal and a second channel that is arranged after the first channel and corresponding to the second output terminal, wherein the channel selection circuit is configured to receive the first edge signal and the first channel signal, select the second channel from the plurality of channels based on the first channel signal, and output the first edge signal to the second channel, wherein the level shifter is configured to output a first gate control signal that is based on the first edge signal to a gate driving circuit via the second output terminal prior to a second gate control signal being output to the gate driving circuit via the first output terminal.

18. The level shifter of claim 17, wherein the logic circuit is further configured to receive from via the at least one input terminal second timing data defining a second time point and second channel data, and output a second edge signal at the second time point defined in the second timing data and a second channel signal based on the second channel data, and the channel selection circuit is configured to receive the second edge signal and the second channel signal, select the first channel based on the second channel signal, and output the second edge signal to the first channel, wherein the level shifter is configured to output the second gate control signal that is based on the second edge signal to the gate driving circuit via the first output terminal after the first gate control signal is output via the second output terminal.

19. The level shifter of claim 18, wherein a pulse width of the first gate control signal is a same as a pulse width of the second gate control signal.

20. The level shifter of claim 18, wherein a pulse width of the first gate control signal is different from a pulse width of the second gate control signal.

* * * * *